UNITED STATES PATENT OFFICE.

EARL P. STEVENSON, OF CAMBRIDGE, MASSACHUSETTS, ASSIGNOR, BY MESNE ASSIGNMENTS, TO GENERAL BOND AND SHARE COMPANY, OF BOSTON, MASSACHUSETTS, A CORPORATION OF DELAWARE.

PROCESS OF EXTRACTING BORAX FROM SALINE DEPOSITS AND BRINES.

1,415,205.            Specification of Letters Patent.    Patented May 9, 1922.

No Drawing.    Application filed August 7, 1919.  Serial No. 315,877.

*To all whom it may concern:*

Be it known that I, EARL P. STEVENSON, a citizen of the United States, residing at Cambridge, in the county of Middlesex and State of Massachusetts, have invented certain Improvements in a Process of Extracting Borax from Saline Deposits and Brines, of which the following description is a specification.

This invention relates to the extraction of borax from the saline brines and deposits found in the western part of this country and is concerned especially with processes for obtaining borax from Searles Lake, California. It has been known for many years that both the brine of this lake and also its salt deposits contain borax in substantial percentages and attempts have been made heretofore to extract the borax content of this brine. The borax obtained in this manner, however, has proved to be too expensive to compete successfully with other sources of supply.

It is the chief object of the present invention to devise a process capable of being practised on a commercial scale for economically extracting borax from this and similar brines. It is a further object of the invention to devise a process of this character which can be successfully practised in connection with the extraction of potash from such brines.

Searles Lake brine consists essentially of a solution containing the elements of sodium chloride, sodium sulphate, sodium carbonate, potassium chloride and borax, together with traces of other substances which are not of sufficient importance to be considered here. While the composition of this brine varies at different parts of the lake and under different conditions, a typical sample of the brine analyzes substantially as follows:—

| | Per cent. |
|---|---|
| Sodium chloride, $NaCl$ | 17.75 |
| Sodium sulphate, $Na_2SO_4$ | 4.46 |
| Sodium carbonate, $Na_2CO_3$ | 4.97 |
| Borax, $Na_2B_4O_7$ | 1.42 |
| Potassium chloride, $KCL$ | 4.65 |

In co-pending applications Serial Nos. 315875 and 315876 filed of even date herewith I have disclosed novel processes for extracting potash from this brine and the present invention provides a process for extracting borax which can be used in connection with the recovery or extraction of potassium chloride from this brine by the processes described in my said applications although it may also be practised independently of these other processes. In both of these potash recovery processes the first step consists in chilling the brine sufficiently to precipitate the greater part of the sulphate, carbonate and borate. The percentages of these substances that will separate out in this manner will vary with the degree to which the temperature of the brine is reduced, and this point will be determined to some extent by the completeness of the separation of the salts and also by considerations of economy and the conditions under which the process is practised. Under most circumstances the most satisfactory temperature appears to be between $-15°$ C. and $-20°$ C. If the sample of brine above referred to is chilled to $-15°$ C. and the crystallized salts filtered off, the remaining brine has a composition substantially as follows:

| | Per cent. |
|---|---|
| $Na_2SO_4$ | .61 |
| $Na_2B_4O_7$ | .81 |
| $Na_2CO_3$ | 1.55 |
| $NaCl$ | 18.15 |
| $KCL$ | 6.57 |

The precipitate has a composition substantially as follows:

| | Per cent. |
|---|---|
| $Na_2SO_4$ | 14.20 |
| $Na_2CO_3$ | 13.90 |
| $Na_2B_4O_7$ | 3.17 |
| $NaCl$ | 22.20 |
| $KCL$ | 1.90 |
| $H_2O$ | 44.63 |

The crystallized salts of the precipitate may now be reduced to a dry state by evaporation, preferably solar evaporation, and the dry mixture can then be treated to extract its borax content. The composition of this mixture of salts is substantially as follows:

| | Per cent. |
|---|---|
| $Na_2SO_4$ | 25.80 |
| $NaCl$ | 40.31 |
| $Na_2CO_3$ | 24.95 |
| $Na_2B_4O_7$ | 5.73 |
| $KCL$ | 3.31 |

For the purpose of separating the borax from the other salts, I take advantage of the great change in solubility of borax with a change in temperature when the borax is in solution with other salts, such as sodium chloride, sodium sulphate and sodium carbonate. This principle can be illustrated by the following table which shows approximately the solubility of borax in grams at different temperatures, in 100 cc. of the solution saturated in sodium chloride and sodium sulfate, all weights calculated on the basis of the anhydrous salts.

| Temperature. | $Na_2B_4O_7$. | NaCl. | $Na_2SO_4$. | Total. |
|---|---|---|---|---|
| 100° C | 38.0 | 23.9 | 9.27 | 71.17 |
| 25° C | 1.96 | 31.5 | 6.05 | 38.51 |
| 0° C | .452 | 36.6 | 1.47 | 36.52 |

Under these conditions it will be seen that on cooling a solution saturated with borax, sodium chloride and sodium sulfate, from 100° C. to 25° C., approximately 95% of the borax will separate out. In the presence of carbonate, the solubility of borax at all temperatures is increased and the recovery realized on cooling is decreased in amounts depending upon the percentage of carbonate in solution. Consequently, in order to extract the borax from the mixture of salts resulting from the evaporation step above described, this mixture is leached or lixiviated with a hot extraction liquor saturated with sodium chloride, sodium sulphate and sodium carbonate. When the extraction liquor is substantially saturated with borax the undissolved salts are filtered off and the hot extraction liquor is cooled to ordinary temperatures, causing the borax to crystallize out. This borax crop may then be filtered off and the extraction liquor used over and over again to recover additional crops of borax. A purer grade of borax, however, can be obtained by adding to the hot extraction liquor, after the undissolved salts have been filtered off, approximately 10% of water or untreated brine. This additional water serves to hold in solution the small quantity of salts that would tend to crystallize out with the borax, and it also supplies the water of crystallization which the borax takes up in separating. Consequently, it produces a purer grade of borax than otherwise would be obtained.

A variation of the above method which may be practised following the refrigerating step as above described, is to digest the chilled out salts in their own water of crystallization. The rate of extraction, with which a chemical process of this character is greatly concerned when operated on a commercial scale, varies as a function of the concentration of the material to be extracted, and the digesting process is of advantage since it substantially increases the percentage of borax in the salts from which the borax is finally extracted. That is, this process dissolves out all the borax and eliminates about one-half of the total solids precipitated in the chilling operation. The liquor obtained by this digestion process is then evaporated, preferably by solar evaporation, and the dried mixture of salts so obtained is extracted for its borax content, as above described.

For the purpose of effecting a more complete extraction of the borax from the brine, the brine left after the chilling operation has been completed may be treated with a precipitant for the borax, sodium carbonate and sodium sulphate remaining in the brine. While the chilling operation removes approximately 65% to 75% of the borax in the brine, practically all of the remaining borax can be precipitated and the precipitate so obtained contains a sufficient percentage of borax to warrant its extraction. The precipitant used preferably is calcium chloride, which precipitates the borax in the form of calcium borates. This precipitate is filtered off and is leached or lixiviated with the solution of borax, sodium carbonate, sodium chloride and sodium sulphate obtained by digesting the chilled out salts in their own water of crystallization, as above described. The sodium carbonate in this leach liquor regenerates the borax by reacting with the above-mentioned insoluble calcium borates to form insoluble calcium carbonate and borax. This liquor is then evaporated to dryness and the dried salts obtained in this manner are extracted for their borax content as previously described.

While theoretically upon cooling the extraction liquor from 100° C. to 25° C. neither sodium chloride nor sodium carbonate should separate, and only a very small weight of sodium sulphate, still the borax usually does occlude and adsorb a comparatively small percentage of these other salts. It is possible, however, to obtain by this process borax of sufficient purity for commercial purposes. If, for any reason, a further purification of the borax is required, this object can be accomplished by adding the impure borax salt to a saturated solution of sodium chloride at approximately 100° C. until the solution is saturated with borax. This solution is filtered, fresh water equal to approximately $\frac{1}{10}$ of the volume of the filtrate is added to it, and the solution is then cooled to ordinary temperatures when the borax separates by crystallization. This treatment gives a very pure grade of borax.

While this process has been specifically described herein as applied to the recovery of borax from Searles Lake brine, it will readily be appreciated by those skilled in this art that the process is applicable to brines of the general nature of that found in Searles Lake whether they come from that particular lake or not, and whether the brine treated is the natural brine taken from the lake, or is brine made from the salt deposits of the lake. Consequently, it will be understood that the term "Searles Lake brine" as used in the appended claims identifies the type of brine to which the present method is applicable rather than brine necessarily taken directly from Searles Lake. It will also be understood that while the process has been herein described with reference to a particular sample of brine, that this procedure has been adopted for the purpose of clearly disclosing the process, and that the composition of the brine may vary considerably without affecting the applicability of the present process. In fact, the composition of the brine at different parts of the lake and under different conditions will vary but these variations do not affect the practise of the process herein described.

While in describing this invention herein reference has been made to a process for recovering potash from Searles Lake brine, it will be evident that the process of this invention can be practised independently of the recovery of other constituents of the brine.

What is claimed as new is:

1. The process of extracting borax from Searles Lake brine which consists in reducing the temperature of the brine to a point sufficiently below zero centigrade to crystallize out a substantial percentage of the borax contained therein together with other salts, separating the salts so crystallized from the remaining brine, and then treating the mixture of salts so obtained to separate its borax content.

2. The process of extracting borax from Searles Lake brine which consists in reducing the temperature of the brine to a point sufficiently below zero centigrade to crystallize out a substantial percentage of a borax contained therein together with other salts, separating the salts so crystallized from the remaining brine, reducing the crystallized salts to a dry condition, and then extracting the mixture of salts so obtained for its borax content.

3. The process of extracting borax from Searles Lake brine which consists in chilling the brine sufficiently to crystallize out a substantial percentage of the borax contained therein together with other salts, separating the salts so crystallized from the remaining brine, treating the mixture of salts so obtained with a hot extraction liquor substantially saturated with sodium sulphate, sodium chloride and sodium carbonate to dissolve the borax, separating the extraction liquor from the undissolved salts, and cooling the liquor so separated to cause the borax to crystallize out.

4. The process of extracting borax from Searles Lake brine which consists in chilling the brine sufficiently to cause a substantial part of the borax and additional salts contained in the brine to crystallize out, digesting the chilled out salts in their own water of crystallization, evaporating the solution so obtained to dryness, and then extracting the resulting mixture of dried salts for its borax content.

5. The process of extracting borax from Searles Lake brine which consists in chilling the brine sufficiently to cause a substantial part of the borax and additional salts contained in the brine to crystallize out, digesting the chilled out salts in their own water of crystallization, evaporating the solution so obtained to dryness, and then treating the resulting mixture of dried salts to separate the borax from the other salts.

6. The process of extracting borax from Searles Lake brine which consists in chilling the brine sufficiently to cause a substantial part of the borax and additional salts contained in the brine to crystallize out, digesting the chilled out salts in their own water of crystallization, evaporating the solution so obtained to dryness, dissolving the borax contained in the dried salts resulting from the evaporation step with a hot extraction liquor saturated with sodium sulphate, sodium chloride, and sodium carbonate, filtering out the undissolved salts and cooling the extraction liquor through the temperature interval in which the borax crystallizes out.

7. The process of extracting borax from Searles Lake brine which consists in chilling the brine sufficiently to cause a substantial part of the borax and additional salts contained in the brine to crystallize out, digesting the chilled out salts in their own water of crystallization, filtering out the undissolved salts from the digestion liquor, evaporating the filtrate to dryness thus producing a mixture of salts containing borax, treating this mixture of salts with an extraction liquor saturated with sodium sulphate, sodium chloride, and sodium carbonate at a temperature of substantially 100° C. to dissolve sufficient borax to substantially saturate the liquor, filtering out the undissolved salts, cooling the extraction liquor to cause the borax to crystallize out, and filtering off the borax so separated.

8. The process of extracting borax from Searles Lake brine which consists in chilling the brine sufficiently to cause a substantial part of the borax with other salts in the brine to crystallize out, filtering off the salts so separated, digesting the chilled out salts in their own water of crystallization, treating the filtrate from the chilling operation with a salt of an alkaline earth metal to convert the borax into a borate of said metal, leaching the salts so obtained with the solution obtained from said digesting operation, evaporating said solution to dryness, and then treating the dried mixture of salts so obtained to extract its borax content.

9. The process of extracting borax from Searles Lake brine which consists in chilling the brine sufficiently to cause a substantial part of the borax, with other salts in the brine, to crystallize out, filtering off the salts so separated, digesting the chilled out salts in their own water of crystallization, treating the filtrate from the chilling operation with a salt of an alkaline earth metal to convert the borax into a borate of said metal, leaching the salts so obtained with the solution obtained from said digesting operation, evaporating said solution to dryness, and then treating the dried mixture of salts so obtained with an extraction liquor from which the borax can be crystallized out, and separating the borax from said extraction liquor.

10. The process of extracting borax from a mixture of salts consisting chiefly of borax, sodium chloride, sodium carbonate and sodium sulphate, which consists in treating the impure mixture of salts with a hot saturated solution of sodium chloride to saturate the solution with borax, filtering the solution, adding a small percentage of fresh water to the filtrate, and then cooling the filtrate to ordinary temperatures to cause the borax to crystallize out.

11. The process of extracting borax from a mixture of salts consisting chiefly of borax, sodium chloride, sodium carbonate and sodium sulphate, which consists in treating the impure mixture of salts with a saturated solution of sodium chloride at substantially 100° C. to saturate the solution with borax, filtering the solution, adding fresh water equal substantially to one tenth of the volume of the filtrate, cooling the resulting solution to ordinary temperatures to cause the borax to crystallize out, and then filtering off the borax so separated.

12. The process of extracting borax from a dried mixture of salts with which the borax naturally occurs which consists in treating said mixture with a hot extraction liquor from which the borax will crystallize out substantially unaccompanied by other salts upon the cooling of the extraction liquor, filtering off the undissolved salts, adding sufficient water to the hot extraction liquor to substantially prevent during the subsequent cooling of the liquor, the crystallization of salts other than borax contained in the liquor, and then cooling the liquor through the temperature interval in which the greater part of the borax crystallizes out of the liquor.

13. The process of extracting borax from a dried mixture of salts with which the borax naturally occurs which consists in leaching said mixture with a hot extraction liquor from which the borax will crystallize out substantially unaccompanied by other salts upon the cooling of the extraction liquor, filtering off the undissolved salts, adding to the hot extraction liquor a sufficient quantity of water to hold in solution substantially all of the salts other than borax which otherwise would tend to separate out during the subsequent cooling of the liquor, and then cooling the liquor sufficiently to cause the greater part of the borax to crystallize out of the liquor.

14. The process of extracting borax from a dried mixture of salts with which the borax naturally occurs which consists in leaching said mixture with a hot extraction liquor from which the borax will crystallize out substantially unaccompanied by other salts upon the cooling of the extraction liquor, filtering off the undissolved salts, adding to the hot extraction liquor substantially ten per cent by volume of water, and then cooling the solution sufficiently to cause the greater part of the borax to crystallize out of the extraction liquor.

15. The process of extracting borax from Searles Lake brine which consists in treating the brine to obtain a dried mixture of salts containing only borax and salts which, in solution with the borax, do not decrease substantially in solubility over a temperature range in which a great change in the solubility of the borax takes place, leaching the dried mixture of salts so obtained with a hot extraction liquor saturated with the salts other than borax present in the mixture, filtering off the undissolved salts, adding to the hot filtrate enough water to hold the other salts in solution while the liquor is being cooled through said temperature interval and to supply the water of crystallization that will be required by the borax, and then cooling the extraction liquor sufficiently to cause the greater part of the borax to crystallize out of the solution.

16. The process of extracting borax from a dried mixture of salts with which the borax naturally occurs, which consists in treating said mixture with a hot extraction liquor to substantially saturate said liquor with borax, said liquor having a composition that enables the borax to crystallize out substantially unaccompanied by other salts upon the cooling of the extraction liquor, filtering off the undissolved salts, then cooling the filtrate sufficiently to cause a greater part of the borax to crystallize out of the filtrate, and purifying the borax so obtained by extracting it with a hot saturated solution of sodium chloride, filtering off the undissolved salts, adding to the filtrate a small quantity of water, and then cooling the filtrate sufficiently to cause the greater part of the borax to crystallize out.

17. The process of extracting borax from Searles Lake brine which consists in chilling the brine to precipitate a substantial percentage of the borax in the brine, treating the precipitate so obtained to produce a dry mixture of salts consisting chiefly of borax, sodium sulphate, sodium carbonate, and sodium chloride, and then extracting this dried mixture of salts with a hot saturated solution of sodium chloride, sodium sulphate and sodium carbonate, filtering off the undissolved salts, and cooling the extraction liquor to ordinary temperatures to cause the borax to crystallize out.

In testimony whereof I have signed my name to this specification.

EARL P. STEVENSON.